July 19, 1938.   H. T. WHEELER   2,124,095
ANNULAR ACCORDION PACKING RING
Filed March 11, 1935   2 Sheets-Sheet 1

Harley T. Wheeler INVENTOR.
BY Jesse R. Stone
Lester B. Clark
ATTORNEYS.

July 19, 1938.  H. T. WHEELER  2,124,095
ANNULAR ACCORDION PACKING RING
Filed March 11, 1935  2 Sheets-Sheet 2
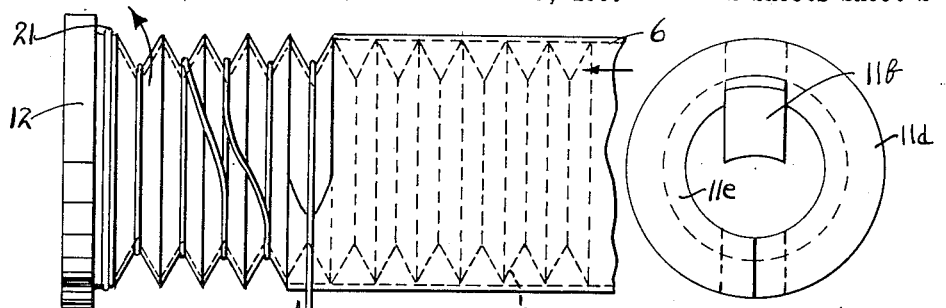
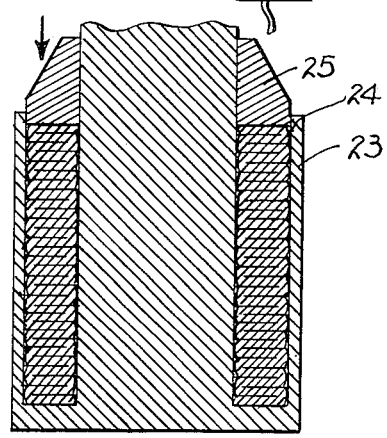
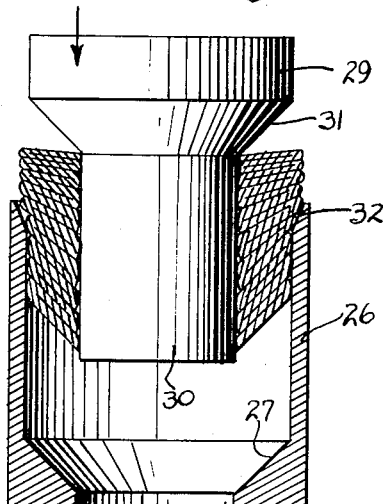
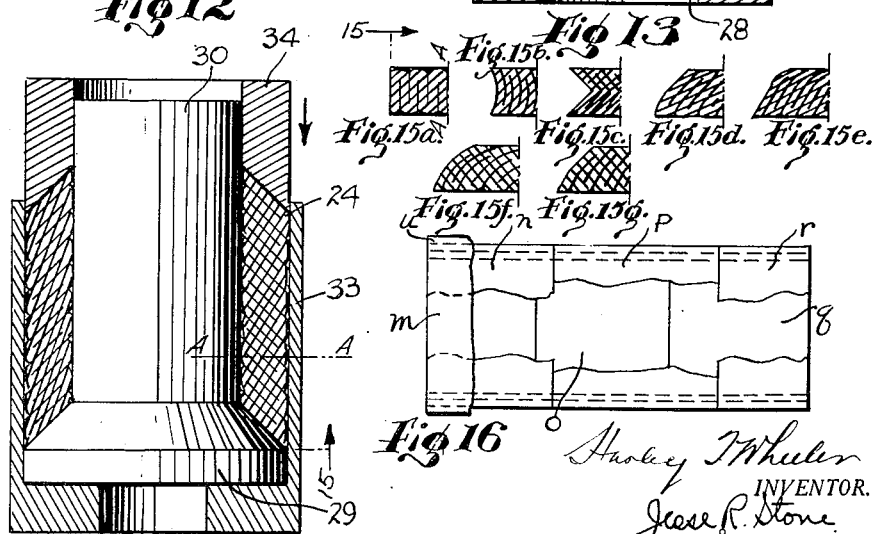
INVENTOR.
Harley T Wheeler
BY Jesse R. Stone
& Lester B. Clark
ATTORNEYS.

Patented July 19, 1938

2,124,095

UNITED STATES PATENT OFFICE 2,124,095

ANNULAR ACCORDION PACKING RING

Harley T. Wheeler, Dallas, Tex.

Application March 11, 1935, Serial No. 10,446

3 Claims. (Cl. 154—2)

My invention relates to packing rings to be used in stuffing boxes about a moving rod or shaft, or on pistons and the like.

It is an object of the invention to provide a complete set of packing for a stuffing box or piston, which is made from a single piece of material of tubular form.

It is another object of the invention to provide a packing having no laps or joints between any of the laminations throughout the packing assembly, regardless of its length.

Another object of the invention is to provide a packing of superior quality which may be produced rapidly and at a low cost.

It is another object of the invention to provide a packing which has a greater density at its outer side where it contacts with the wall of the stuffing box, or on the inner surface as may be desired.

A similar advantage lies in the fact that the packing assembly may be of relatively uniform density except at the folds.

It is a further object to provide a packing assembly provided with folds wherein the pressure fluid may be trapped and thus produce a highly elastic packing.

Referring to the drawings herewith, Fig. 1 is a central, longitudinal section through a stuffing box showing one form of my packing therein.

Fig. 10 is a side elevation illustrating the forming of the packing upon the mandrel.

Fig. 11 is an end view of the mandrel showing the manner in which it may be removed from the packing.

Fig. 12 is a broken, vertical section through a mold in which the packing may be tamped into shape.

Fig. 13 is a similar view showing a mold in which the shape of the packing may be changed from a flat to a frusto-conical shape.

Fig. 14 is a similar section showing the compression of the packing into its final form.

Figs. 15a to 15g show diagrammatically and in transverse section certain forms in which the packing may be produced.

Fig. 16 is a broken side view showing a multiple density type of tube which may be used.

Figure 1:
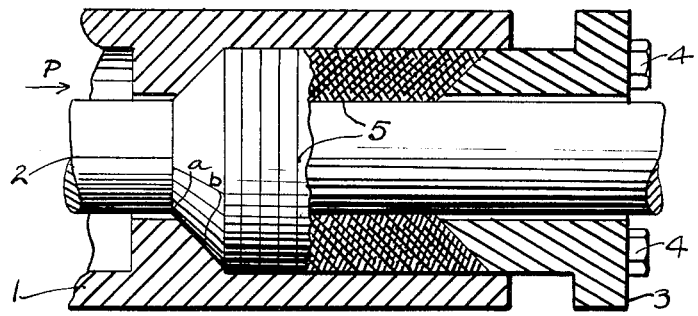

In forming a continuous packing assembly for stuffing boxes and the like, I contemplate forming the same to fit within a stuffing box 1, wherein a rod or shaft 2 is movable either longitudinally or rotatably. The packing 5 is shown as formed frusto-conically at its ends and with the edges of the folds lying in concentric cylindrical surface. This packing is held in a tapered seat a—b by means of a gland 3 adapted to be tightened in position by cap screws 4 in the usual manner. In this stuffing box the fluid pressure is exerted in the direction of the arrow P.

Figures 2, 3:
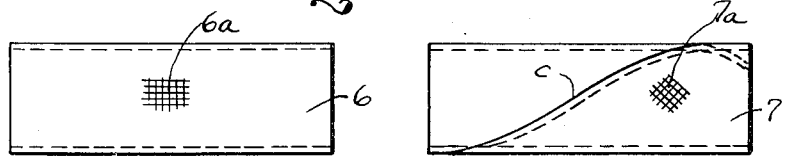
Fig. 2 is a side elevation of a tubular fabric member from which a packing assembly may be made.
Fig. 3 is a similar view wherein the tube is made up of a spirally wound strip with overlapping edges.
Figure 4:
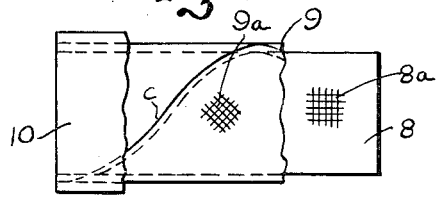
Fig. 4 is a side elevation of a tubular member having more than one layer of material thereon.
Figure 5:
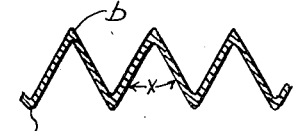
Fig. 5 is a sectional detail illustrating the manner in which the material is folded in the formation of the packing.

In forming this packing I contemplate using a tubular woven strip of packing material such as is shown in Figs. 2, 3, and 4. In Fig. 2 the tubular packing member is shown as made up of a single thickness of woven material which may be formed preferably with a straight weave, the warp running lengthwise of the tube as shown at 6—a.

The tube may be formed of a flat blank of woven material preferably cut on the bias and having its edges overlapping, as shown at c—d, thus forming a seam which may be cemented or sewed together. This tube 7 may be formed into a packing assembly in which the seam will not be arranged in a straight line parallel with the axis, and may be made to pack off pressures effectively.

In Fig. 4 I have shown how the tube may be made up of one thickness 8 with a straight weave as shown at 8—a, upon which may be placed a second layer of material formed as shown in Fig. 3, and cut on the bias as shown at 9—a. This may be covered with a third layer of wrapping material as shown at 10, it being understood that the original blank may be of one or more thicknesses as desired.

Figures 6, 7:
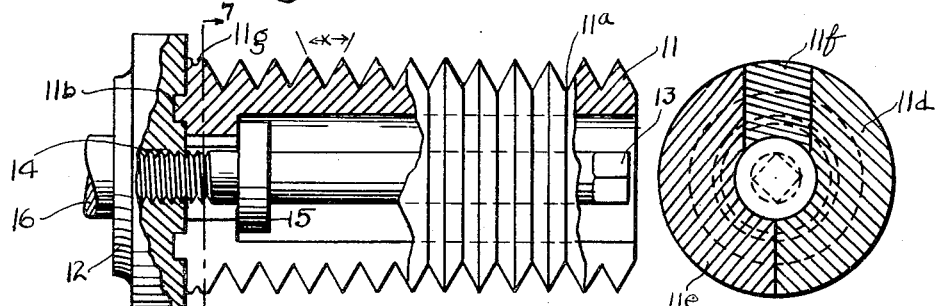
Fig. 6 is a broken side view illustrating the mandrel upon which packing may be formed.
Fig. 7 is a transverse sectional view on the plane 7—7 of Fig. 6.

This tubular strip of woven material may be made of cotton fabric or where it is subjected to heat it is preferably formed of asbestos fabric. It is formed in the tubular shape shown and placed over a mandrel such as is shown in Figs. 6 and 7. With reference to these views it will be seen that the mandrel 11 has annular serrations or grooves therein as shown at 11—a. The said mandrel is of tubular form having at one end a projecting flange 11—b which engages within a head 12. The body of the mandrel is preferably made up in a plurality of sections as shown in Fig. 7, there being two side sections 11—d and 11—e, and a smaller, intermediate section 11—f, with parallel sides fitting at one side between the two main sections. This section 11—f is adapted to move inwardly so as to allow the mandrel to collapse when it is removed. This mandrel is adapted to be held against the head in assembled position by means of an interior shaft 13 having a threaded connection with the head as shown at 14. A radial flange 15 on said shaft engages with a shoulder on the interior of the mandrel section.

The head 14 is provided with a shaft 16 by means of which the mandrel may be rotated in the formation of the packing member as will be later described.

Figure 8:
Fig. 8 is a perspective view of a mold wherein one form of core may be made upon which the packing is formed.

The collapsible mandrel just described is adapted to be used on the larger size of packing, but on the small sizes it is difficult to use the collapsible mandrel, and I contemplate the use of a mandrel made of material which may be melted or dissolved away from the packing after it has been formed. In Fig. 8 I have shown a mold wherein such a mandrel may be cast. Said mold is made up of two cooperating sections 17 and 18 having recesses 19 therein whereby a mandrel such as shown at 20 in Fig. 9 may be cast.

The manner of forming the packing on a mandrel such as I have described is shown in Fig. 10. The sleeve of the packing material is large enough to be moved longitudinally over the crests of the ridges 11—a and the end of said sleeve adjacent the head 12 is secured thereto by means of a wire 21 which is wound about the head to press the tube of packing material into the groove 11—g shown in Fig. 6. The wire is then wound around the packing so as to press the same into the grooves in the mandrel.

This winding is done by the rotation of the mandrel, and a weight 22 on the end of the wire thus exerts a uniform tension on the same as it is wound about the mandrel forcing the flexible material in the sleeve into the groove as shown in Fig. 10. When one complete turn of the wire about the mandrel has been made the wire is moved over into the next adjacent groove and another complete turn is made to force the packing material into position and the wire is then curved over the crest of the next adjacent ridge into the next groove. When this has been done for a sufficient number of turns to provide the length of packing desired the mandrel may be then collapsed to allow the mandrel to be withdrawn.

The tubular strip of packing thus formed into folds is compressed longitudinally by placing the same within a mold 23, such as is shown in Fig. 12. Said mold has an annular chamber 24 in which the folded packing is placed, and the same is then compressed tightly into its folded position by means of a ring 25 upon which pressure may be exerted by any well known means.

Although the packing may be used in the form shown in Fig. 12, with the folds lying radially to the axis, I prefer to form the packing assembly so that the folds will lie at an inclination to the axis, so that one end of the packing assembly will be frusto-conical in shape, the other end having a frusto-conical recess. This is done by forcing the folded packing shown in Fig. 12 into a cup-shaped box 26 of the same inner diameter as the stuffing-box into which the packing is to fit.

The lower end of the box 26 has a tapered seat 27 terminating in an opening 28 of the same diameter as the shaft which is to fit within the packing. I then employ a die such as shown at 29 on which there is a cylindrical post 30 of the same size as the shaft connected to the head 29 by a tapered area 31 having the same inclination as the seat 27. The upper end of the box 26 is beveled at 32 so that the packing may be forced therein by the movement of the die directly into the box. When this is done it will be seen that the folds of the packing will be distorted into an inclined position so that when the die has been forced completely down, the packing assembly will be in its finished shape.

In order to fix the packing in its final form a third step is performed by placing the die 30 within a box 33 similar to that shown in Fig. 13 but of sufficient size to receive the head 29 of the die. The packing is then compressed by exerting heavy pressure upon a ring or gland 34 which has its end beveled to conform to the taper of the packing. The ring may be thus tightly compacted so as to assume a final set ready for inserting within the stuffing box.

Figures 9, 17:
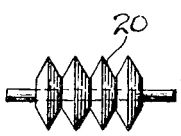
Fig. 9 is a side elevation of a mandrel or core formed in the mold shown in Fig. 8.
Fig. 17 is a side elevation of a mandrel showing how the packing material may be woven directly upon the mandrel.

It will be possible to make the smaller size of packing particularly with the mandrel shown in Fig. 9. The same method is followed except that when the tubular packing member has been pressed between the ridges forming the body of the mandrel, the mandrel may be removed by the use of acid or other material which disintegrates the core; or, particularly where the packing is made of asbestos the core may be made of lead, babbitt, or other easily fusible metals, waxes and compounds, which under high temperatures will melt and flow from the tubular member. The further steps by means of which the packing is pressed into its final form are the same as those just described.

While I have shown the packing as made in what may be called a frusto-conical form, it is to be understood that other shapes may be employed, depending upon the particular purpose for which the packing is intended.

In Figs. 15a to 15g, inclusive, I have shown a series of sections such as would be formed between the line A—A and the line 15 in Fig. 14. At a the folds are radial relative to the rod. At b the folds are curved or cupped relative to the rod; at c the folds are V-shaped; the form shown at d I call my concave cone; at e, the convex cone; and, at f, I have the rounded cone; at g, the double tapered cone. It is to be understood that the rings are pressed into different shapes by forming the dies of similar shape during the formation of the packing ring.

In Fig. 17 I have shown how the fabric of the packing 6 may, if desired, be woven directly upon the mandrel 20' by any well known type of weaving machine for this purpose. When this packing is woven completely, the mandrel is removed as described and the packing is then ready for the molding process.

I contemplate the use of packing material of generally uniform density. However, in Fig. 16 I have illustrated how the packing tube may be of varying density. In thus constructing the tube I contemplate using as a basis for the tube a section $m$ of loose weave and light density. At $o$ is a section of closer weave and greater density, while at $q$ may be a section of higher density and closer weave. If desired, this tube may then be wrapped with sections $n$, $p$ and $r$, the ends of which overlap the seams in the original tube and also made of similar density material. At $u$ I have shown how a third layer may be superimposed upon the sections previously assembled.

This packing formed with annular folds I call annular accordion packing. This form of packing assembly is a great improvement on all other types with which I have experimented, such as strip wound rings cemented or vulcanized together; braided packing cut and formed into rings; and for some purposes even better than the helical accordion type of packing which I sometimes form. As the fluid under pressure penetrates through the laminations of the packing, there is a seepage flow longitudinally of the assembly, and a small drop of pressure fluid occurs across each lamination causing the conical surfaces to contact with the rod 2.

In most packing constructions this sort of thrust action would cause direct contact between the fabric of the packing and the rod, thus producing wear. In my accordion packing, however, a high saturation of fluid is built up and around each fold thus creating a film of liquid, gas, or vapor as the case may be, between the fold and the rod, and along the line of contact, thus clearly reducing friction.

Another advantage of the accordion type of packing is that no cements or binders are necessary between the laminations to hold them together or seal off against the pressure fluid. Thus a slight difference of pressure may cause a reaction to form a seal. The fluid under pressure is trapped inside of each fold and causes each lamination to move lengthwise to press against the adjacent fold, or against the end of the box. There is also an expansion between the stuffing box wall and the rod. I have found that the accordion type of packing is the tightest porous packing yet devised at either high or low pressures. It is effective during variations of pressure or temperature, and also in cases of misalignment of the rod.

Due to the manner in which the packing is forced into the grooves of the mandrel there is a stretching of the warp of the fabric over the crests of the ridges on the mandrel. The drawing operation pulls the warp of the tube into the V-shaped groove and increases the density at that point, but the woof is pulled apart in the groove by the pressing action of the line or wire. The finished ring will therefore be densest at the outer folds, and be more open toward the inner point of contact. This accommodates the accordion type of packing for the correct construction of stuffing box rings, as lubrication by the fluid medium will be facilitated.

I also contemplate forming a packing material by a felting action in which fine fibres or lint are blown with cement or synthetic resins upon the outer surface of the mandrel until a layer of the desired thickness, properly cemented together is formed. Asbestos fibres, cotton, or linen lint, and similar fibrous material held together by a cementitious binder thus applied to the mandrel, will assume the shape of the mandrel. When the mandrel is removed thereafter the accordion-shaped tube can be compressed and formed into a packing unit as is done in the other embodiment.

Having described my invention, what I claim is:

1. A process of forming packing comprising forming a tube of woven fabric material, placing the same upon an annularly corrugated mandrel, forcing the material into the grooves in the corrugations of said mandrel to produce annular laminations in said tube, collapsing and removing said mandrel, compressing the tube longitudinally into accordion-shaped folds, and then distorting said folds into frusto-conical shape.

2. A process of constructing packing comprising, forming an annularly corrugated tube of fabric material upon a mandrel, removing said mandrel, compressing said tube longitudinally to cause the corrugations to lie in transverse folds with the adjacent sides of said folds closely in contact with each other, and then molding said compressed tube so that said folds will assume a frusto-conical shape.

3. The process of forming a packing unit comprising constructing a tube of woven fabric, stretching spaced annular areas of said tube and folding them inwardly to form regular annular corrugations in said tube, placing said tube in a mold and compressing the same longitudinally into parallel folds and then distorting said tube into frusto-conical shape by decreasing the outer diameter of said folds.

HARLEY T. WHEELER.